(12) United States Patent
Tamura et al.

(10) Patent No.: US 7,785,513 B2
(45) Date of Patent: Aug. 31, 2010

(54) METHOD OF MANUFACTURING MOLDED PRODUCT AND METHOD OF MANUFACTURING STORAGE MEDIUM

(75) Inventors: Hiroaki Tamura, Kawasaki (JP); Mitsuo Takeuchi, Kawasaki (JP); Hideyuki Kikuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 44 days.

(21) Appl. No.: 12/388,247

(22) Filed: Feb. 18, 2009

(65) Prior Publication Data

US 2009/0206513 A1 Aug. 20, 2009

(30) Foreign Application Priority Data

Feb. 20, 2008 (JP) .............................. 2008-038956

(51) Int. Cl.
  *B29C 33/38* (2006.01)
  *B29C 33/40* (2006.01)
(52) U.S. Cl. .................... 264/219; 204/192.34; 216/94; 427/198; 427/199; 427/202; 427/204; 427/205
(58) Field of Classification Search .................. 264/219, 264/293; 204/192.34; 216/94; 427/198, 427/199, 202, 203, 204, 205, 264, 270, 271
See application file for complete search history.

(56) References Cited

U.S. PATENT DOCUMENTS 5,772,905 A    6/1998  Chou
7,192,873 B1 * 3/2007  Kim et al. .................... 438/702
7,629,021 B2 * 12/2009 Nakao ......................... 427/127
2006/0286345 A1  12/2006 Nakao
2007/0054445 A1  3/2007  Kim et al.
2008/0160190 A1 * 7/2008  Takeuchi et al. ............. 427/203

FOREIGN PATENT DOCUMENTS

| EP | 0 640 406 A1 | 3/1995 |
|---|---|---|
| JP | B2 2828386 | 11/1998 |
| JP | 2005-076117 | * 9/2003 |
| JP | A 2005-347041 | 12/2005 |
| JP | 2006-156977 | 6/2006 |
| JP | A 2006-346820 | 12/2006 |
| JP | A 2007-193249 | 8/2007 |

* cited by examiner

*Primary Examiner*—Joseph S Del Sole
*Assistant Examiner*—Robert Dye
(74) *Attorney, Agent, or Firm*—Greer, Burns & Crain Ltd.

(57) ABSTRACT

A method of manufacturing a molded product includes forming a coat film for covering and concealing particles with the surface of a board while filling the gaps among the particles, and separating the coat film for holding the particles on the reverse side from the board. The coat film and the particles are etched from the reverse side of the separated coat film, the particles are removed from the coat film, and an array of dents carved by the particles is formed on the reverse side of the coat film. A film is formed on the reverse side of the coat film, and a molded product having an array of protrusions on the surface is formed from the film.

10 Claims, 17 Drawing Sheets

METHOD OF MANUFACTURING MOLDED PRODUCT AND METHOD OF MANUFACTURING STORAGE MEDIUM

CROSS-REFERENCE TO RELATED APPLICATIONS

This application is based upon and claims the benefit of priority of the prior Japanese Patent Application No. 2008-38956, filed on Feb. 20, 2008 the entire contents of which are incorporated herein by reference.

FIELD

The example discussed herein is related to a method of manufacturing a molded product.

BACKGROUND

The method of manufacturing a die used in manufacture of a magnetic disk is widely known. In this manufacturing method, nano particles are arrayed on a board. A liquid photo-curing polymer layer is formed on the board. The photo-curing polymer layer fills up gaps among nano particles. After the photo-curing polymer layer is cured, the board is peeled off from the photo-curing polymer layer. As a result, an array of dents carved by nano particles is formed on the surface of the photo-curing polymer layer. On the surface of the photo-curing polymer layer, a nickel plated film is formed. A die of nickel is then molded.

In such manufacturing methods, the liquid photo-curing polymer layer completely envelopes the nano particles. Therefore, in the transferred dents, the openings are narrowed. As a result, growth of the plated film is inhibited in the dents, and the plate film is not formed sufficiently. If the nickel plated film is formed in the dents, the plated film is left over in the dents after parting, and the surface shape of the photo-curing polymer layer is not transferred to the surface of plated film with sufficient precision.

SUMMARY

According to an aspect of the embodiment, a method of manufacturing a molded product includes arraying spherical fine particles on the surface of a board, forming a coat film for covering and concealing the spherical fine particles with the surface of the board while filling the gaps among the spherical fine particles, and separating the coat film from the board. The method includes a process of etching the coat film and spherical fine particles from the reverse side of the separated coat film, removing the spherical fine particles from the coat film, and forming an array of dents carved by the spherical fine particles on the reverse side of the coat film. A film is formed on the reverse side of the coat film, and a molded product having an array of protrusions on the surface is formed from the film.

According to an aspect of the embodiment, a method of manufacturing a storage medium includes forming a resin layer on the surface layer of a board for the storage medium, pressing an array of protrusions of a molded product manufactured in the method of manufacturing a molded product against the resin layer, and forming a surface shape reflecting the array of protrusions on the resin layer. A shape conforming to a specified pattern is formed on the surface of the board for the storage medium based on the surface shape.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Preferred embodiments of the present invention will be explained with reference to accompanying drawings.

Figure 1:
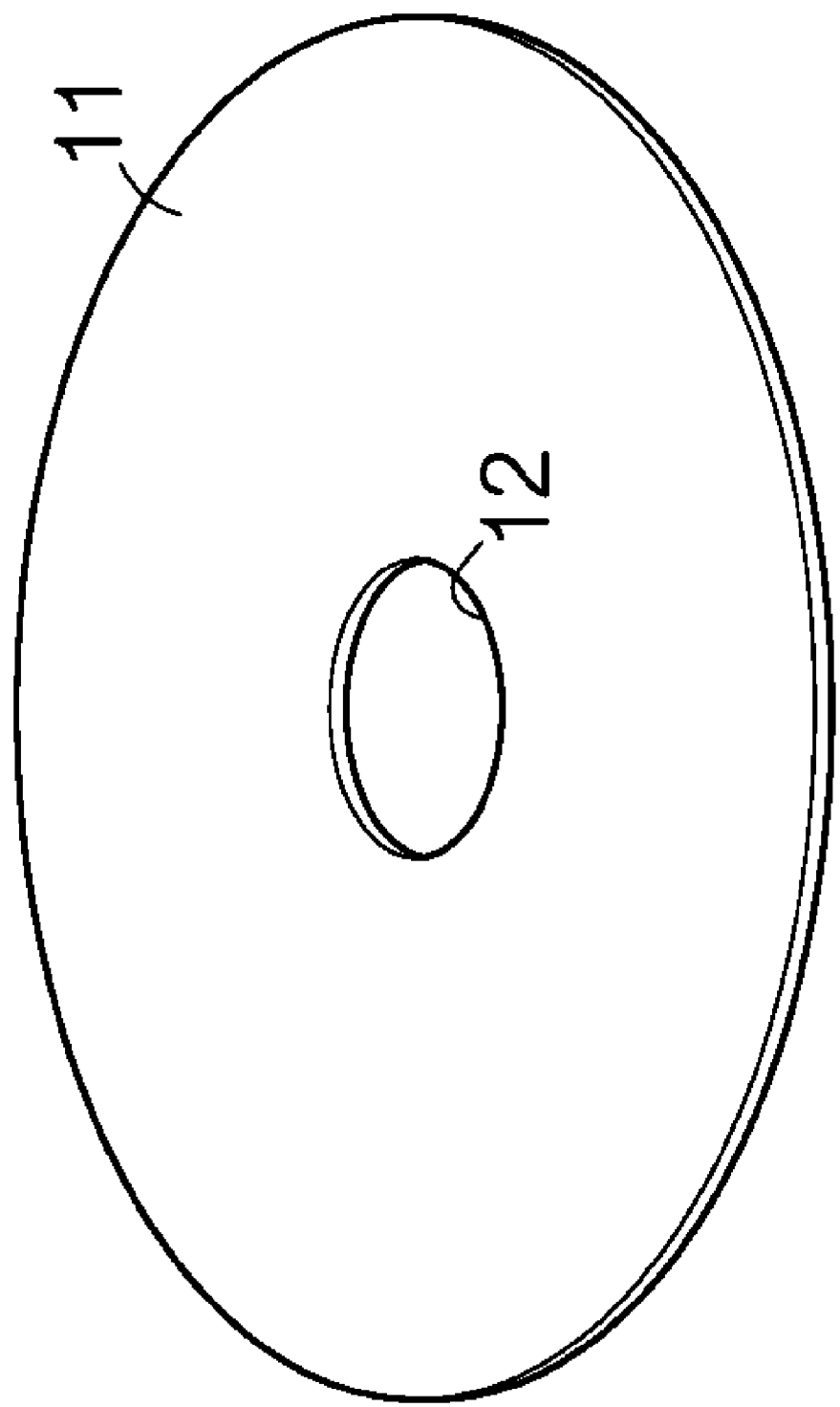
FIG. 1 is a perspective view schematically illustrating a magnetic disk.

FIG. 1 schematically illustrates a magnetic disk 11 as a magnetic recording medium. The magnetic disk 11 is formed like a disk. A circular through-hole 12 is formed in the center of the disk. When the magnetic disk 11 is assembled in, for example, a hard disk drive device, the magnetic disk 11 supports a spindle shaft in the through-hole 12. On the surface and reverse sides of the magnetic disk 11, a plurality of recording tracks are formed concentrically around its central shaft. The recording tracks are arrayed in a radial direction of the magnetic disk 11 at proper intervals. In the recording tracks, magnetic domains are arrayed at each bit in each line direction. As mentioned below, the magnetic domains are established based on the columnar magnetic body. One magnetic domain may be established by one columnar magnetic body, or one magnetic domain may be established by a plurality of columnar magnetic bodies.

Figure 2:
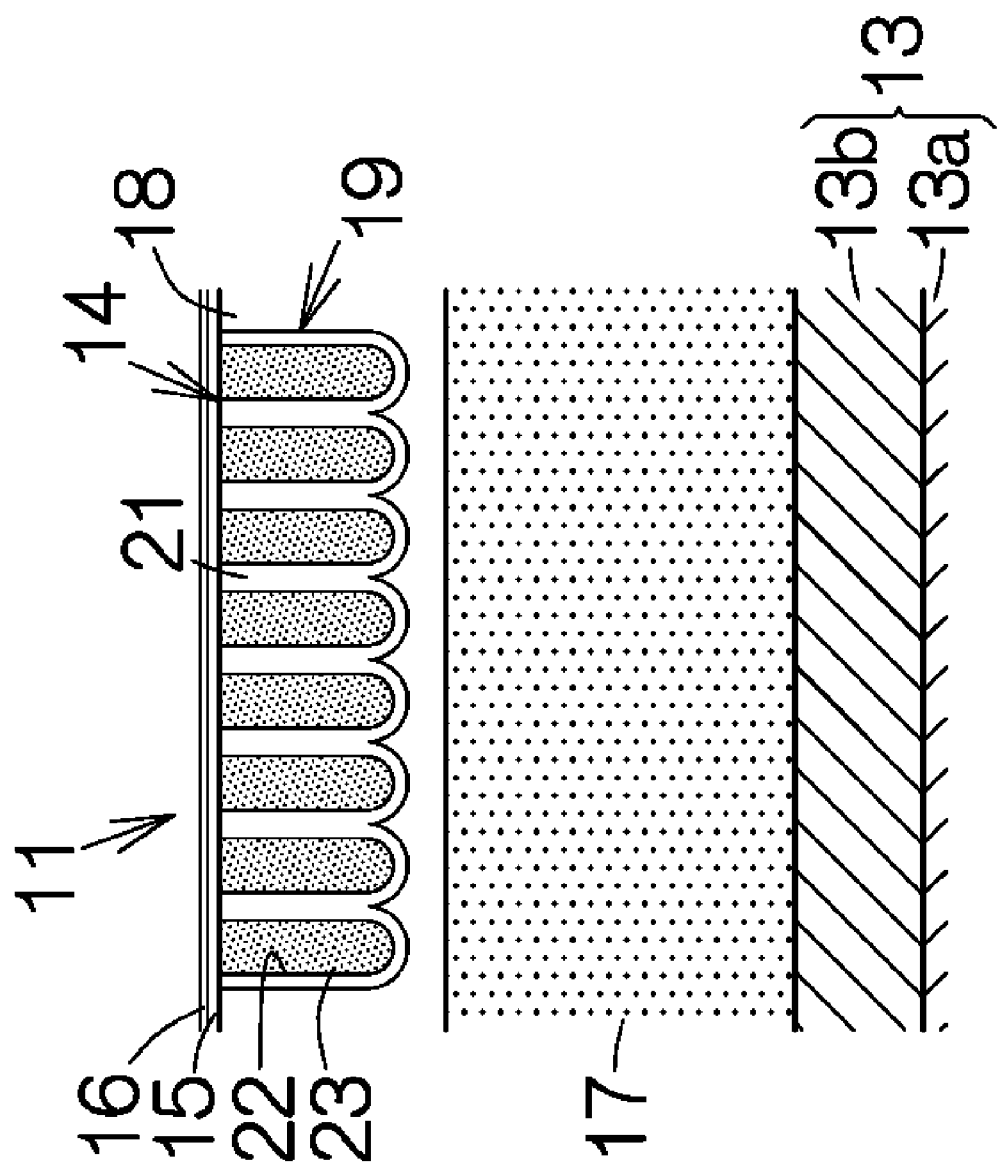
FIG. 2 is a partially magnified sectional view of a magnetic disk.

FIG. 2 specifically illustrates the sectional structure of the magnetic disk 11. The magnetic disk 11 is a so-called perpendicular magnetic recording medium. The magnetic disk 11 includes a board 13 as a support body, and a multi-layer structural film 14 spreading across the surface and reverse sides of the board 13 (the reverse side is not illustrated). The board 13 is composed of, for example, a disk-like silicon (Si) main body 13a, and an amorphous silicon oxide ($SiO_2$) film 13b spread across the surface and reverse sides of the silicon main body 13a. As the board 13, however, a glass board, an aluminum board, or a ceramic board may be also used.

Magnetic information is recorded in the multi-layer structural film 14. The surface of the multi-layer structural film is coated with a protective film 15 such as diamond-like carbon (DLC) film, or a lubricant film 16 such as perfluoropolyether (PFPE) film.

The multi-layer structural film 14 has a lining layer 17 spread over the surface of the silicon oxide film 13b. The lining layer 17 is composed of, for example, a soft magnetic body such as iron-tantalum carbide (FeTaC) film or nickel-iron (NiFe) film. Herein, for example, an FeTaC film of about 200 nm in film thickness is used as the lining layer 17. In the lining layer 17, an easy-to-magnetize axis is established in the in-plane direction defined parallel to the surface of the board 13.

An intermediate layer 18 covers the surface of the lining layer 17. The intermediate layer 18 is composed of, for example, a nonmagnetic body such as aluminum (Al) film. A compound material, that is, a recording magnetic layer 19 covers the surface of the intermediate layer 18. The recording magnetic layer 19 has a base body, that is, a substrate layer 21 on the surface of the intermediate layer 18. The substrate layer 21 is formed of, for example, a nonmagnetic body such as alumina ($Al_2O_3$).

Tiny holes, that is, nano holes 22 are drilled in the surface of the substrate layer 21. The nano holes 22 partition the circular columnar space. The central axis of the circular columnar space is orthogonal to the surface of the substrate layer 21, that is, a flat plane. The diameter of nano holes 22 is set at about 4 nm to 150 nm. The depth of nano holes 22 is set to form an aspect ratio of 2 to 10. The aspect ratio is the ratio of the depth to the diameter of nano holes 22. The columnar magnetic bodies 23 are disposed in the nano holes 22. Herein, the nano holes 22 are filled with the columnar magnetic bodies 23. The columnar magnetic bodies 23 contain at least any magnetic body, for example, such as iron (Fe), cobalt (Co) or nickel (Ni). The columnar magnetic bodies 23 may also contain, for example, chromium (Cr), platinum (Pt) palladium (Pd), or similar material. Herein, cobalt is contained in the columnar magnetic bodies 23. The intervals of the columnar magnetic bodies 23, that is, the intervals of the nano holes 22 are set, for example, at about 4 nm to 150 nm. In the individual columnar magnetic bodies 23, an easy-to-magnetize axis is established in a perpendicular direction orthogonal to the surface of the substrate layer 21.

Figure 3:
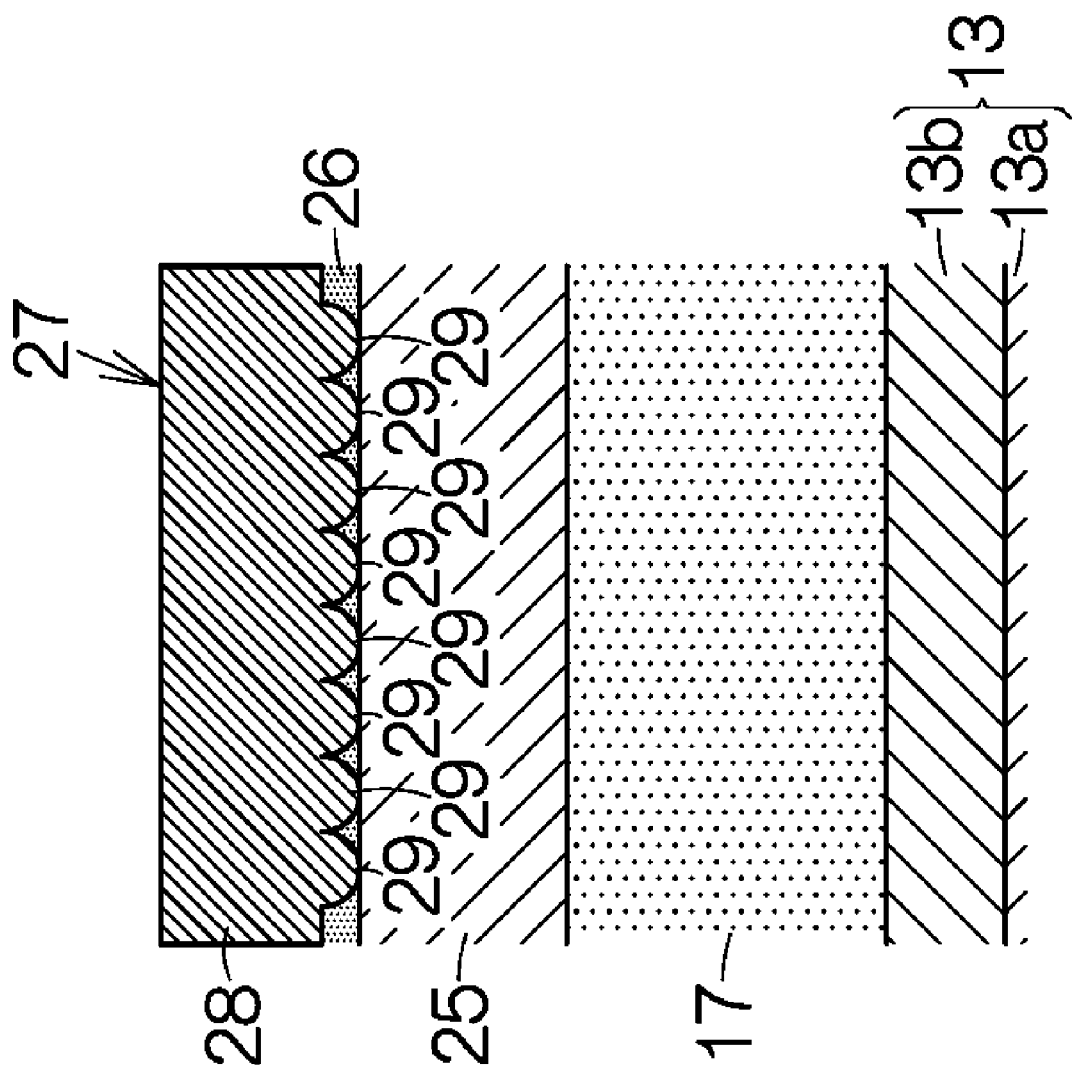
FIG. 3 is a diagram schematically illustrating a die pressed to the surface of a board.

The method of manufacturing the magnetic disk 11 is described below. First, a disk-like board 13 is prepared. As illustrated in FIG. 3, a lining layer 17 and an aluminum layer 25 are sequentially formed on the surface of the board 13. The lining layer 17 and the aluminum layer 25 are formed, for example, by the sputtering method or vacuum deposition method.

In succession, nano holes 22 are formed in the surface of the aluminum layer 25. When forming the nano holes 22, first, a resist film 26, that is, a resin layer is formed on the surface of the aluminum layer 25. To form the resist film 26, for example, a thermoplastic acrylic resin is used, such as polymethyl methacrylic acid (PMMA) resin. The polymethyl methacrylic acid resin is applied on the surface of the aluminum layer 25. The film thickness of the polymethyl methacrylic acid resin is set, for example, at about 100 nm. Simultaneously with heating of the board 13, a die 27 is pressed to the surface of the aluminum layer 25. The pressing pressure is, for example, about 10 MPa.

An array of protrusions 29 is formed on the die 27 by the surface of a plate material 28. The individual protrusions 29 are shaped, for example, like a dome. The peaks of the protrusions 29 are arrayed along the array of central axes of the nano holes 22. In this die 27, as described later, the peaks of the protrusions 29 may be arrayed in one virtual plane at high precision. When pressing the die 27, the peaks of the individual protrusions 29 are pressed against the surface of the aluminum layer 25.

Figure 4:
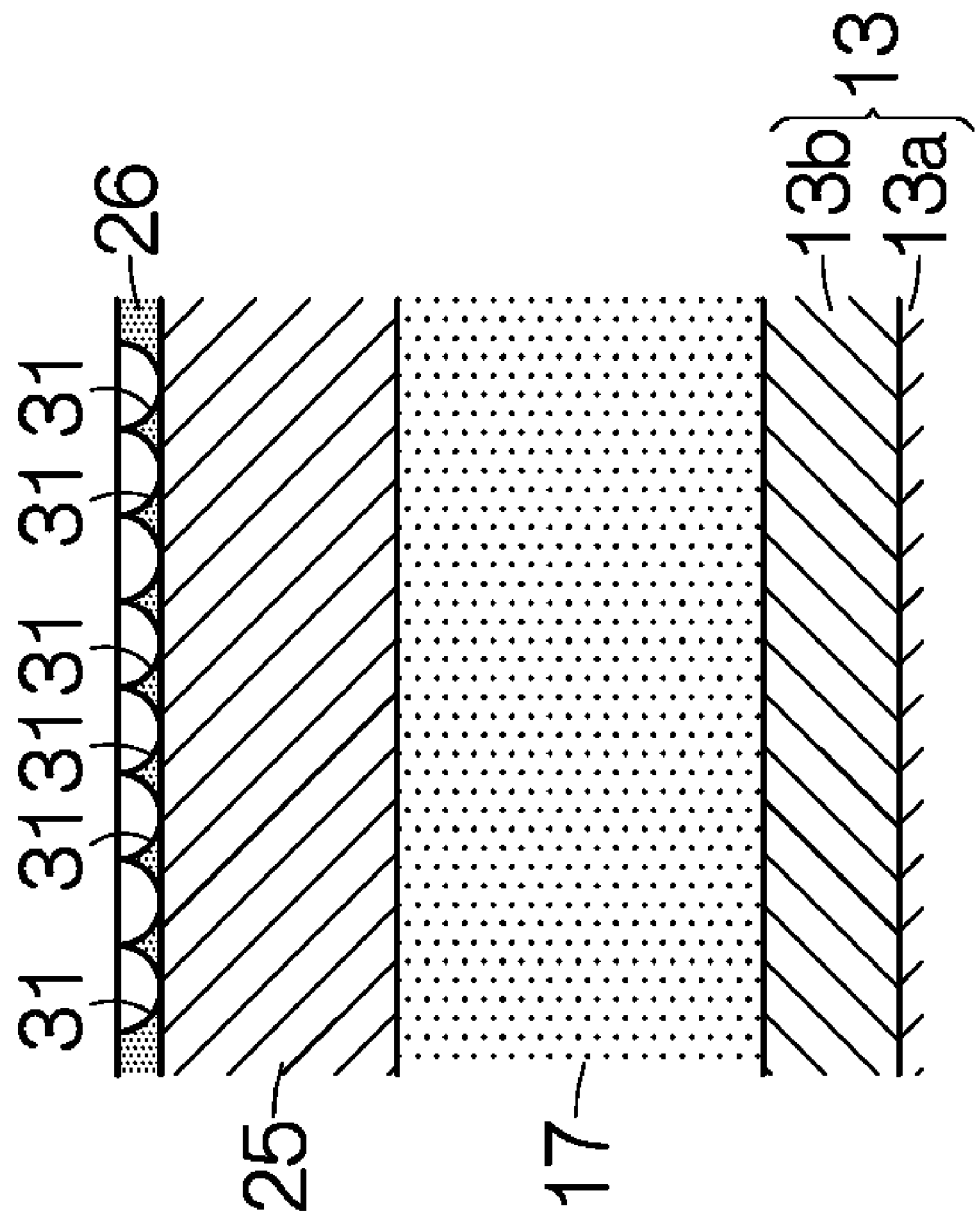
FIG. 4 is a diagram schematically illustrating a resist film formed on the surface of a board.

Subsequently, the board 13 is cooled. The polymethyl methacrylic acid resin is solidified. After solidification, the die 27 is peeled off from the board 13. As illustrated in FIG. 4, dents 31 are formed in the resist film 26 along the array of protrusions 29. That is, the surface of the resist film 26 has a surface shape reflecting the array of the protrusions 29.

Figure 5:
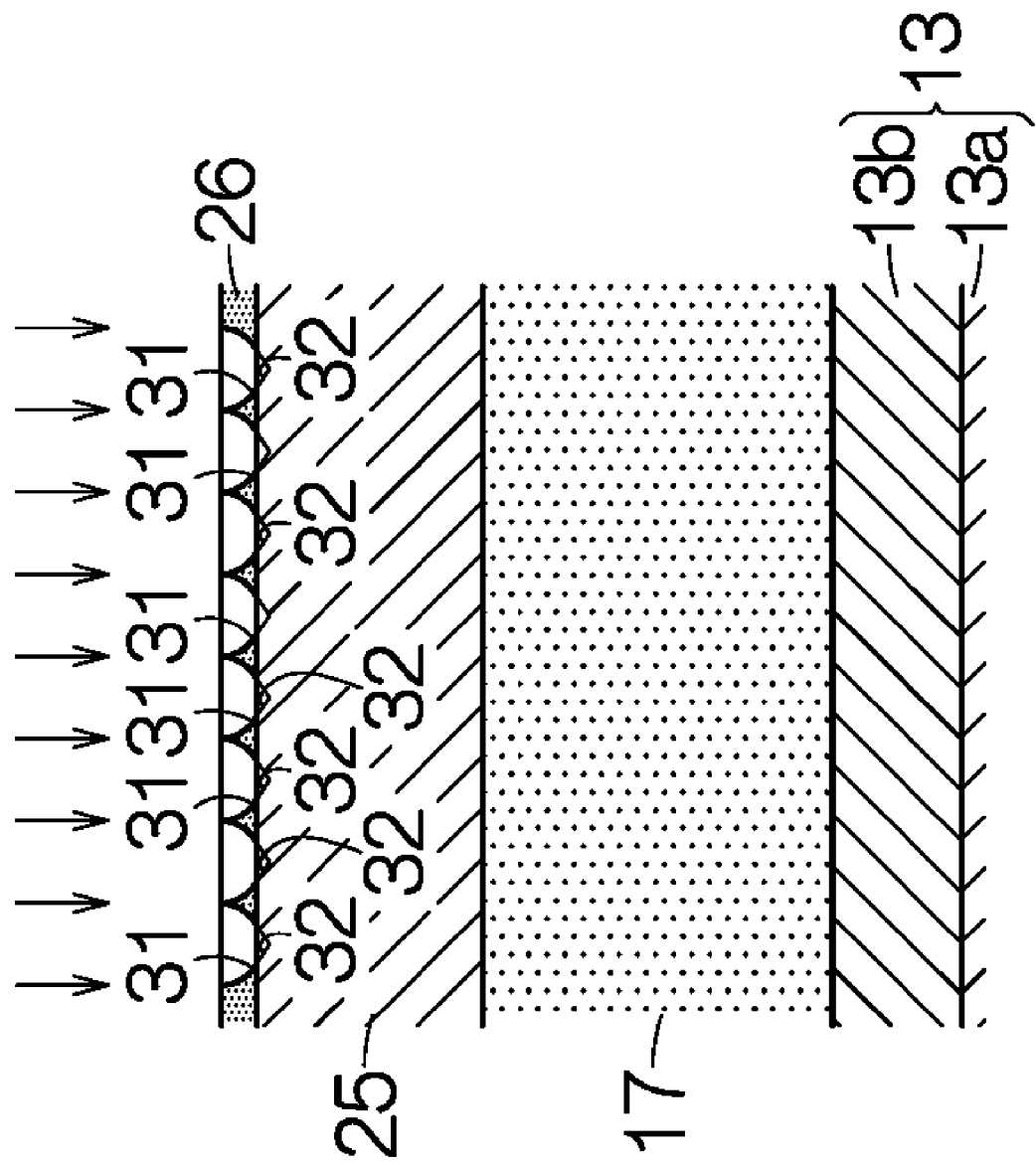
FIG. 5 is a diagram schematically illustrating ion milling applied on the surface of a board.

Based on the surface shape of the resist film 26 thus formed, as illustrated in FIG. 5, fine holes 32 are formed in the surface of the aluminum layer 25 according to a specified pattern. To form the holes 32, ion milling is applied to the surface of the aluminum layer 25. Ion particles are thrust to the surface of the aluminum layer 25 and the resist film 26. The high frequency power is set, for example, at about 500 W. In the chamber, argon gas is passed, for example, at a flow rate of about 30 sccm. By the function of the resist film 26, the array of the holes 32 may reflect the array of the protrusions 29 with high precision. After formation of the holes 32, the resist film 26 is removed.

Figure 6:
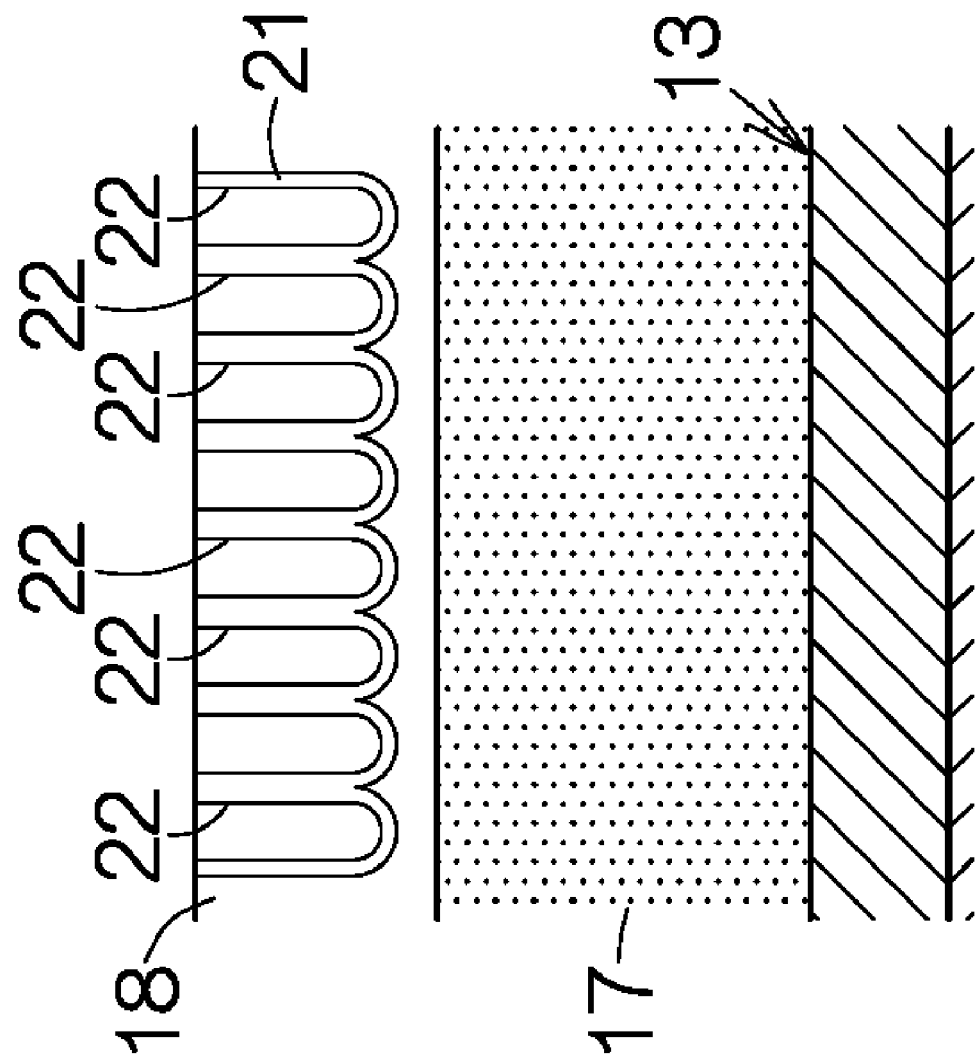
FIG. 6 is a diagram schematically illustrating nano holes formed on the surface of a board.

Successively, an anodic oxidation process is applied to the aluminum layer 25. The aluminum layer 25 is immersed in an oxalic acid bath. A voltage is applied to the aluminum layer 25. The applied voltage is set, for example, at about 40 V. As illustrated in FIG. 6, by the anodic oxidation, the nano holes 22 are grown from the holes 32. The holes 32 function as origins of the nano holes 22. Thus, the array of the nano holes 22 reflects the array of the protrusions 29. The depth of the nano holes 22 reaches about 100 nm. In the forming process of the nano holes 22, the surface of the aluminum layer 25 is oxidized. As a result, the substrate layer 21 is formed from the aluminum layer 25. Aside from the substrate layer 21, the aluminum layer 25 is left over as an intermediate layer 18.

Figure 7:
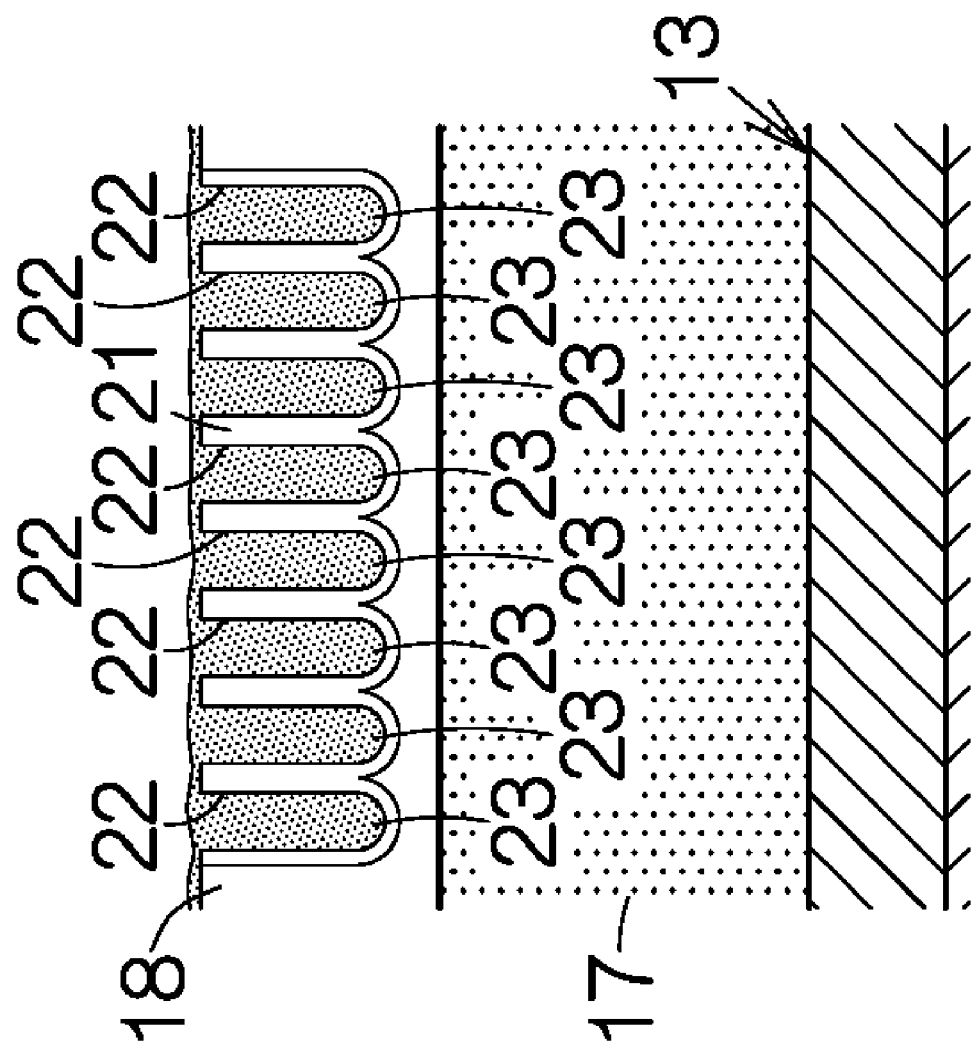
FIG. 7 is a diagram schematically illustrating a cobalt film formed on the surface of a board.
Figure 8:
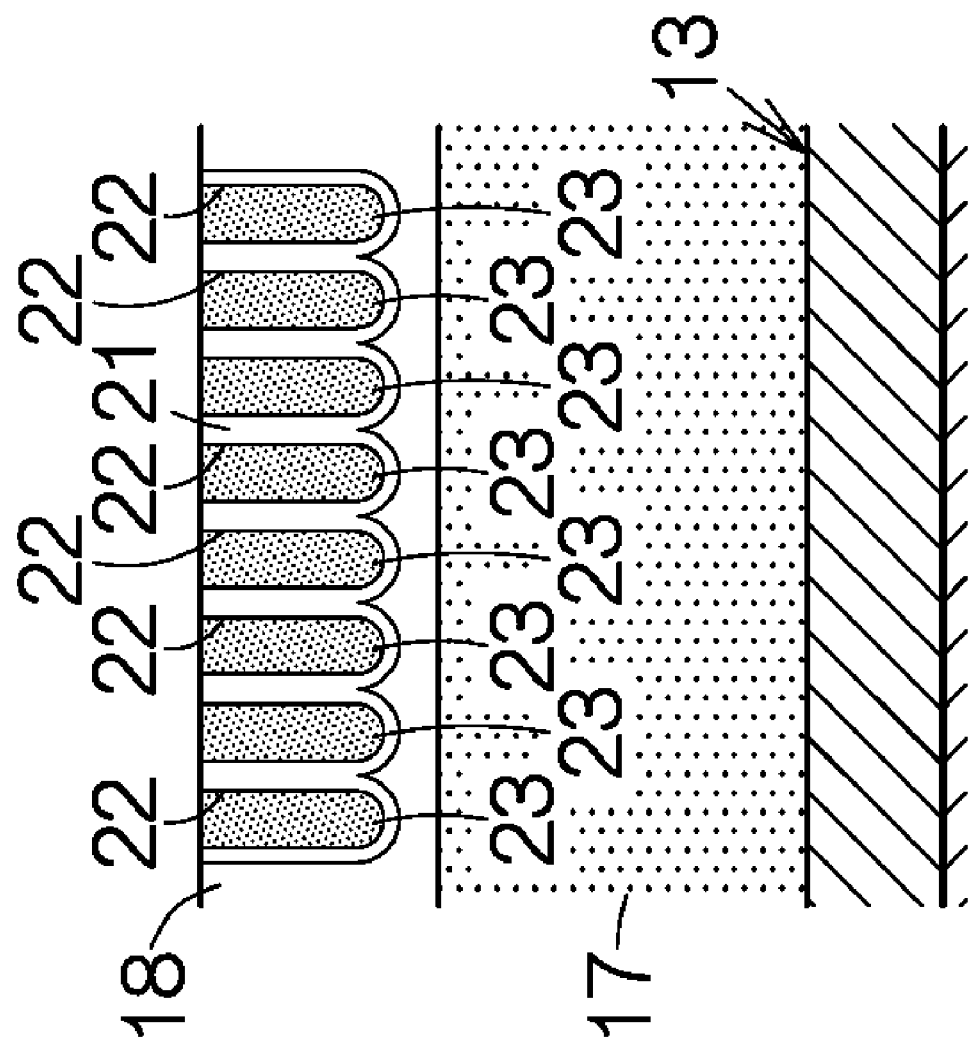
FIG. 8 is a diagram schematically illustrating a columnar magnetic body formed on the surface of a board.

Afterwards, a cobalt film is formed on the surface of the substrate layer 21. The film is formed by a plating method. The board 13 is immersed in a cobalt sulfate bath. As illustrated in FIG. 7, the nano holes 22 are filled with cobalt. Thus, columnar magnetic bodies 23 are formed in the individual nano holes 22. The cobalt film is processed by chemical mechanical polishing (CMP). As a result, as illustrated in FIG. 8, the cobalt film overflowing from the nano holes 22 is removed. Individual and independent columnar magnetic bodies 23 are established. On the surface of the substrate layer 21, a protective film 15 and a lubricant film 16 are formed, as seen in FIG. 2. The protective film 15 is formed, for example, by sputtering The lubricant film 16 is applied, for example, by dipping method. On the columnar magnetic bodies 23, an easy-to-magnetize axis is established in a direction orthogonal to the surface of the board 13. To establish the easy-to-magnetize axis, a magnetic field is applied to the columnar magnetic bodies 23 during the heating process. Meanwhile, formation of the linking layer 17 and aluminum layer 25, formation of the nano holes 22 and columnar magnetic bodies 23, and formation of the protective film 15 and lubricant film 16 may be executed simultaneously on the surface and reverse sides of the magnetic disk 11.

Figure 9:
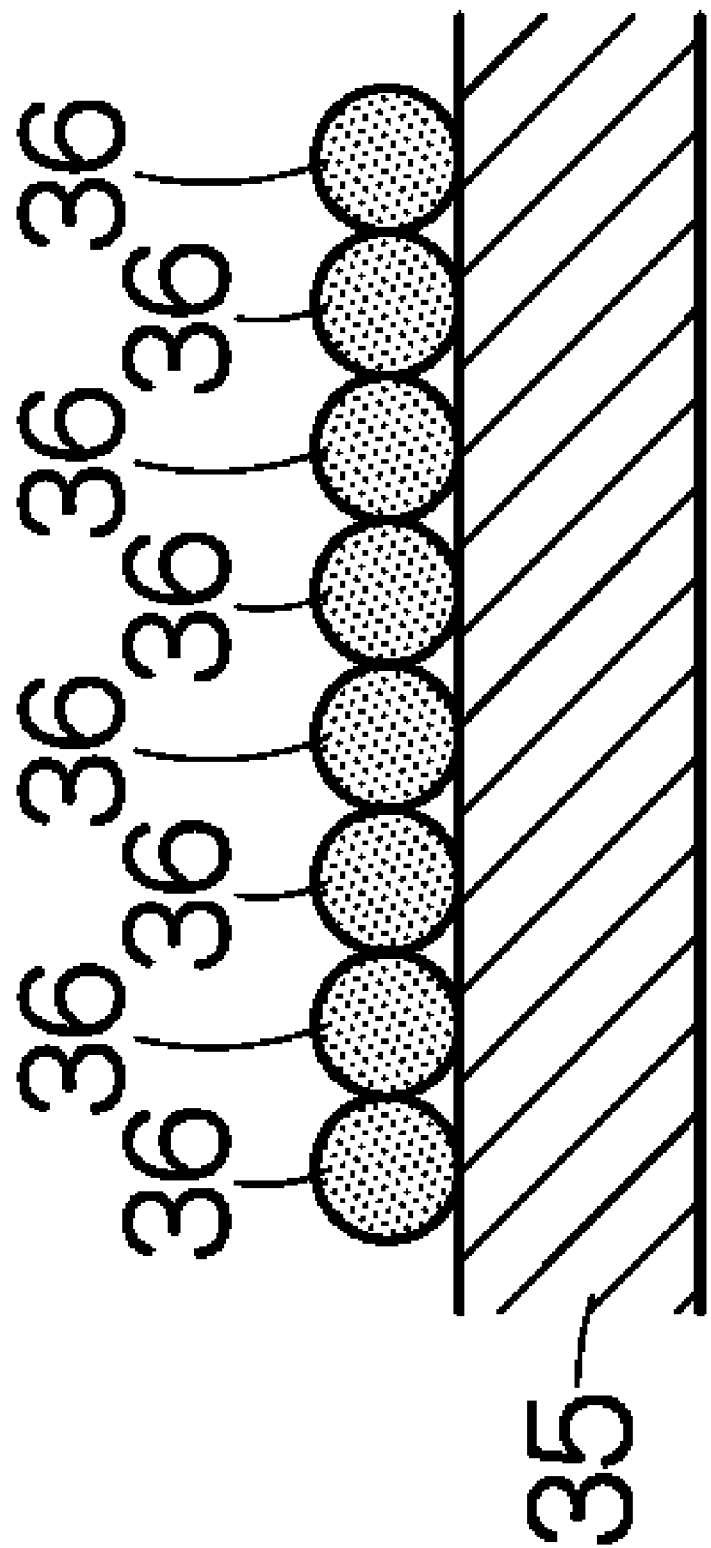
FIG. 9 is a partially magnified sectional view schematically illustrating spherical fine particles arrayed on the surface of a silicon wafer.

The method of manufacturing the die 27 in the first embodiment of the present technique is described below. First, a disk-like silicon wafer is prepared. On the surface of the silicon wafer, an oxide film layer is formed, that is, a silicon oxide ($SiO_2$) layer. The silicon oxide layer is formed, for example, by processing the silicon wafer by thermal oxidation. As illustrated in FIG. 9, spherical fine particles 36 of silicon oxide are applied on the surface of the silicon wafer 35. In the application process, the silicon wafer 35 is immersed in a suspension of spherical fine particles 36. The average particle size of the spherical fine particles 36 is set, for example, at about 100 nm. The concentration of the spherical fine particles 36 is set at, for example, 1 wt % for 100 wt % of the suspension. When the silicon wafer 35 is lifted from the suspension at a speed of 1 µm/sec, as illustrated in FIG. 9, a single layer of spherical fine particles 36 is formed on the surface of the silicon wafer 35. On the surface of the silicon wafer 35, spherical fine particles 36 are arrayed according to a specified rule based on the self-assembled property.

Figure 10:
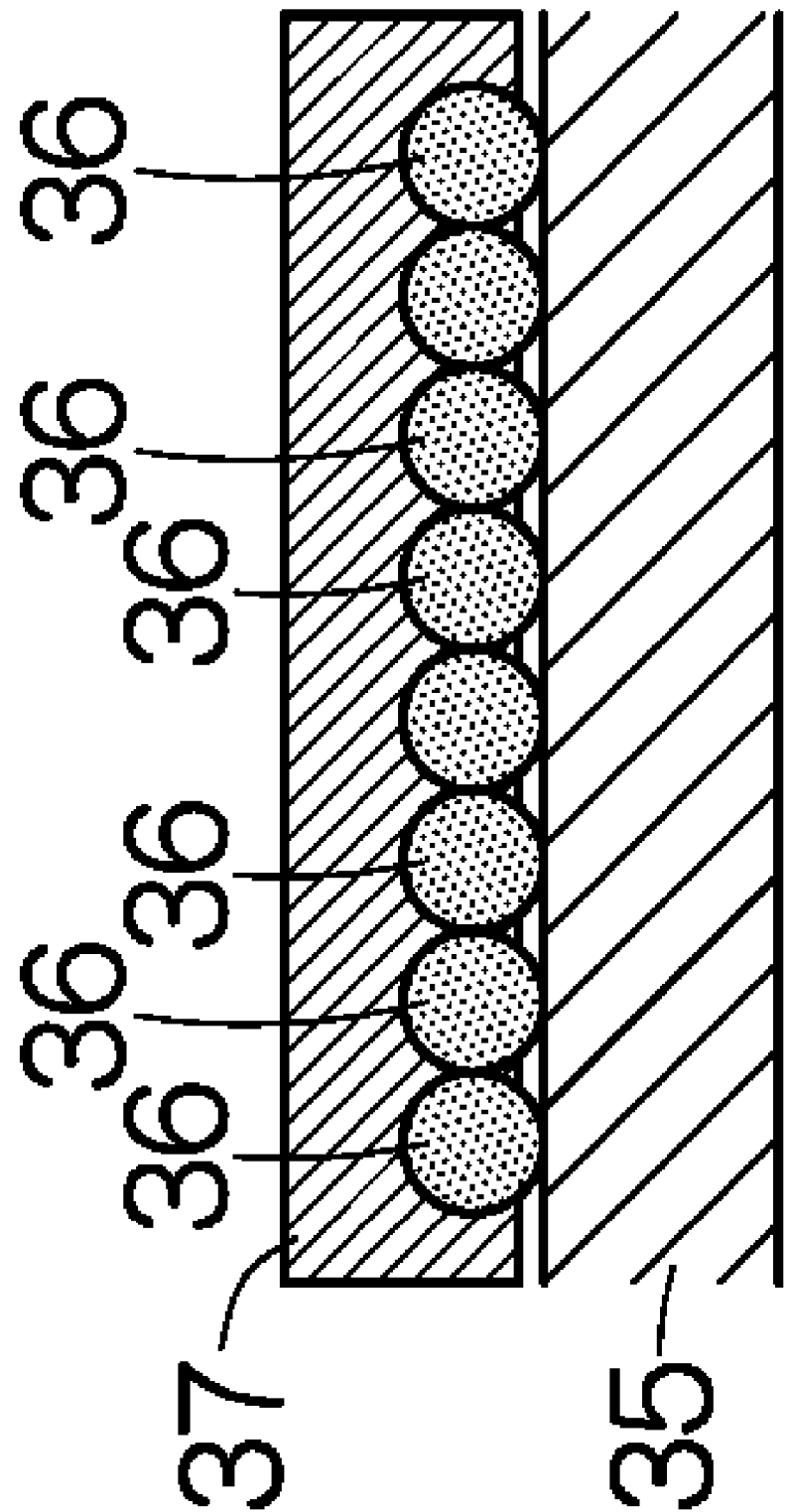
FIG. 10 is a partially magnified sectional view schematically illustrating a nickel coat film formed on the surface of a silicon wafer.

On the surface of the silicon wafer 35, as illustrated in FIG. 10, a nickel coat film 37 is formed to cover the surface of the silicon wafer 35. To form the film, an electrode film of nickel (Ni) is formed on the surface of the silicon wafer 35. The thickness of the electrode film is set, for example, at about 20 nm. The film is formed by, for example, vacuum deposition. The electrode film covers the upper hemisphere of the spherical fine granules 36. At the same time, the surface of the silicon wafer 35 is covered, including the gaps among the spherical fine particles 36. The formed electrode film is processed by electrocasting. The silicon wafer is immersed, for example, in a nickel sulfamate bath. A current of, for example, 50 A flows in the electrode film continuously for 2 hours. As a result, a nickel coat film 37 is formed in a thickness of 0.2 mm. The nickel coat film 37 fills in the gaps among the spherical fine particles 36, and covers and conceals the spherical fine particles 36 on the surface of the silicon wafer 35. Since the nickel coat film 37 has a sufficient film thickness, the nickel coat film 37 functions as a plate material. At this time, in vacuum deposition method, nickel atoms are collected sufficiently on the upper hemisphere of the spherical fine particles 36. On the other hand, nickel atoms are hardly collected in the shade of the spherical fine particles 36 or on the lower hemisphere. Therefore, in the shade of the spherical fine particles 36, nickel coat film 37 is hardly formed. The lower hemisphere is partially covered. Slight gaps are likely to be formed between the spherical fine particles 36 and the surface of the silicon wafer 35.

Figure 11:
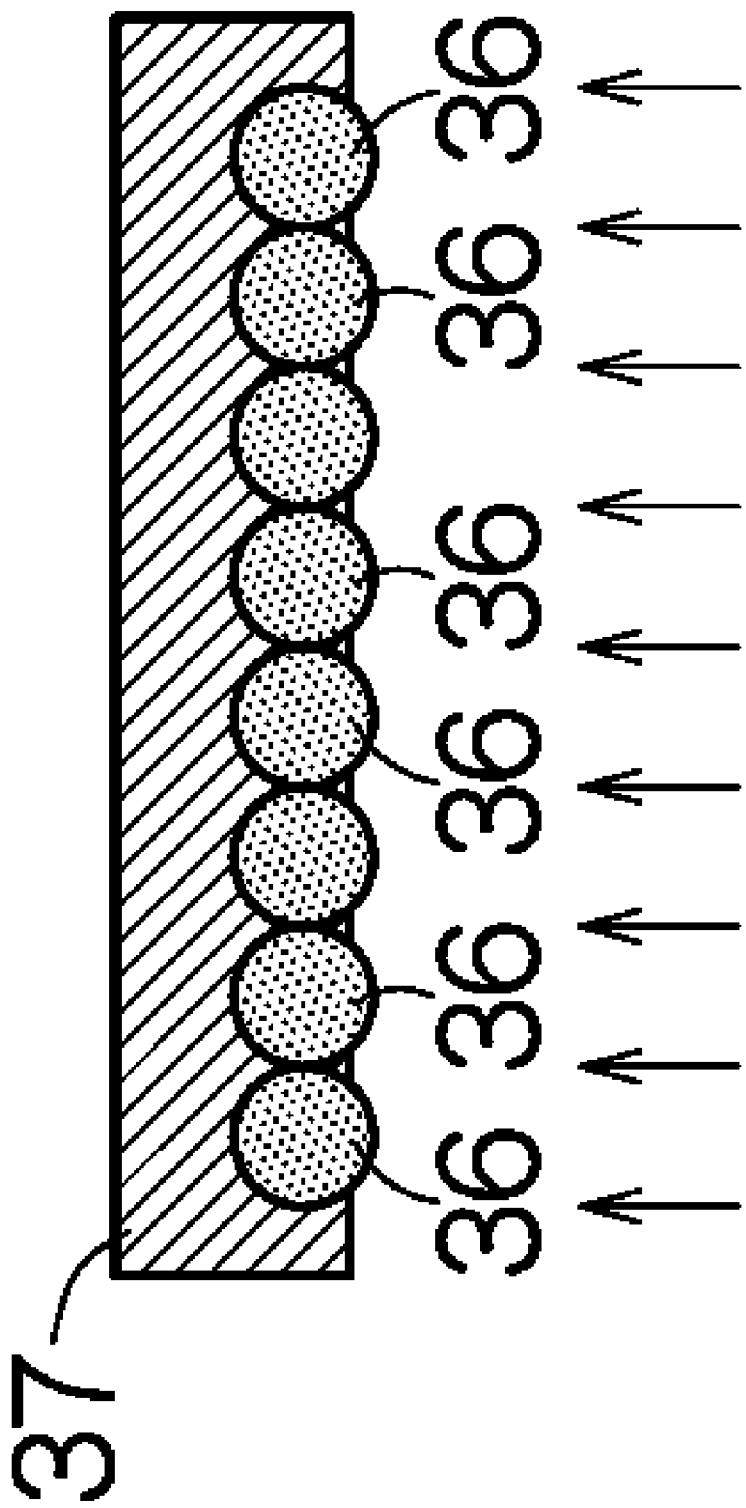
FIG. 11 is a partially magnified sectional view schematically illustrating ion milling applied on the reverse side of a nickel coat film and spherical fine particles.
Figure 12:
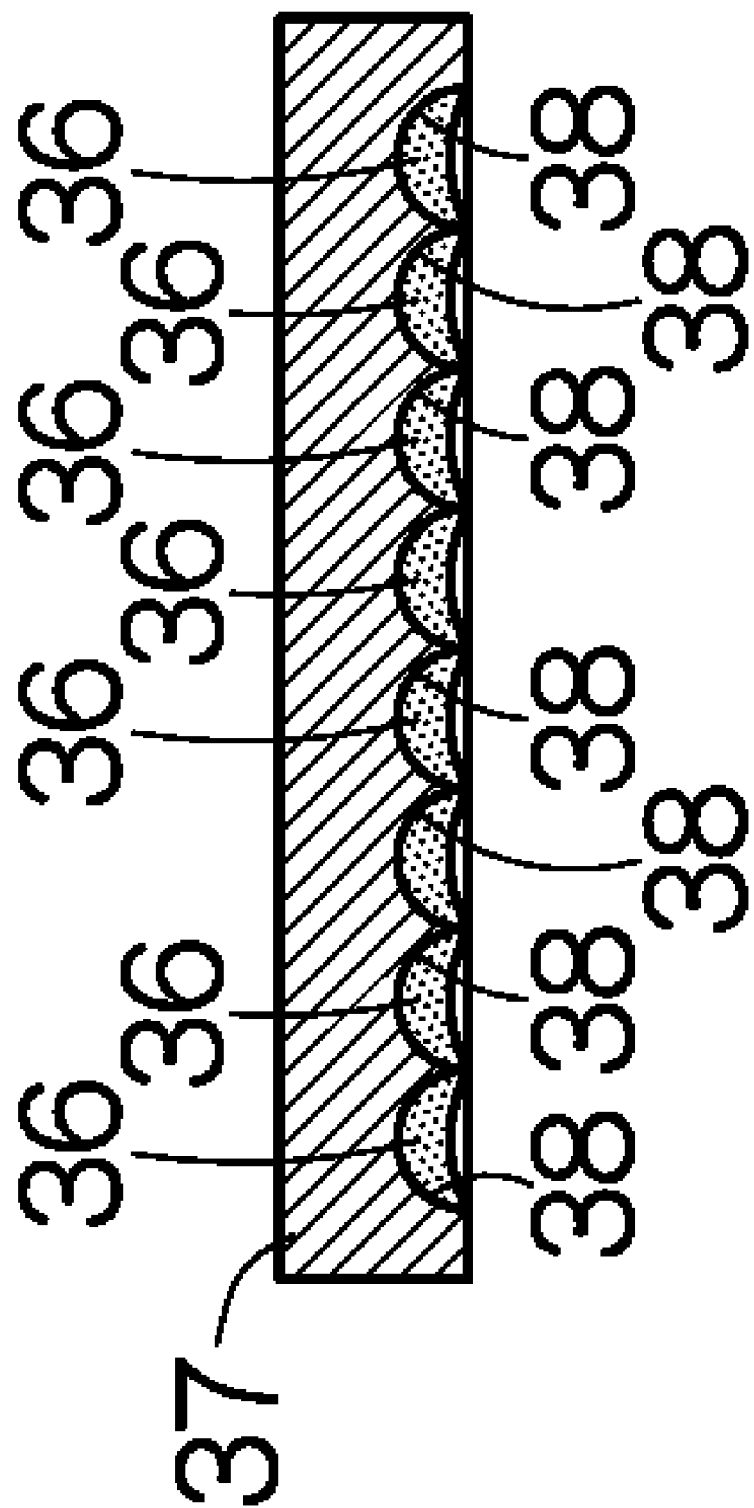
FIG. 12 is a partially magnified sectional view schematically illustrating the nickel coat film and spherical fine particles after ion milling.

Next, as illustrated in FIG. 11, the nickel coat film 37 is separated from the surface of the silicon wafer 35. The spherical fine particles 36 are held on the reverse side of the nickel coat film 37. Etching is conducted on the reverse side of the nickel coat film 37. Dry etching is applied for the etching process. Herein, ion milling is applied. Ion particles hit against the reverse side of the nickel coat film 37 and the spherical fine particles 36. The high frequency power is set, for example, at about 700 W. In the chamber, argon gas is passed at a flow rate of about 30 sccm. As a result, as illustrated in FIG. 12, the reverse side of the nickel coat film 37 is shaved gradually. At the same time, the spherical fine particles 36 are shaved. When the dents 38 carved by the spherical fine particles 36 shrink smaller than the hemispheres, ion milling is terminated. At this time, the etching rate of the spherical fine particles 36 is adjusted. According to the adjustment, the spherical fine particles 36 are left over in the dents 38 until the end of ion milling. The inner walls of the dents 38 are covered continuously with the spherical fine particles 36. Therefore, the dents 38 are protected from collision of ion particles. The dents 38 maintain the shape carved by the spherical fine particles 36.

Figure 13:
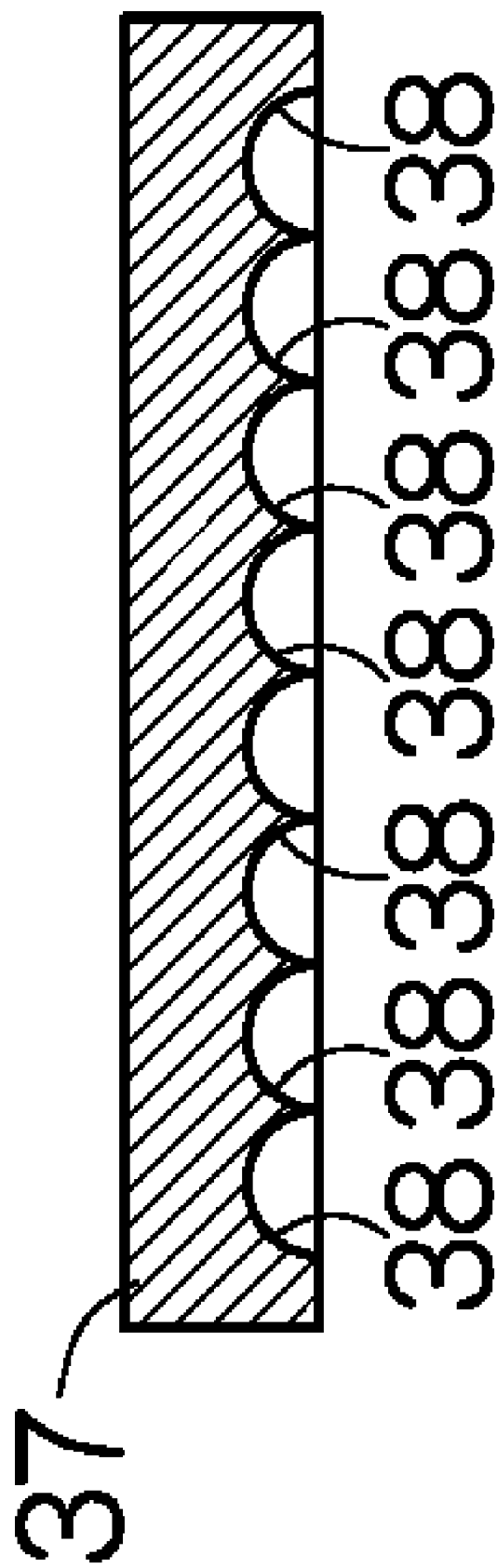
FIG. 13 is a partially magnified sectional view schematically illustrating an array of dents formed on the reverse side of a nickel coat film.

As illustrated in FIG. 13, the remaining spherical fine particles 36 are removed. The nickel coat film 37 is immersed, for example, in an aqueous solution of hydrogen fluoride at concentration of 5 wt %. In the aqueous solution of hydrogen fluoride, hydrogen fluoride by 5 wt % is in the entire aqueous solution. The spherical fine particles 36 are dissolved in the aqueous solution. At the same time, the nickel residue generated by ion milling is also dissolved in the aqueous solution. As a result, an array of dents 38 is formed on the reverse side of the nickel coat film 37. The individual dents 38 are carved by the spherical fine particles 36. The individual dents 38 are divided into partial spheres reduced from the hemispheres, that is, partial spheres becoming thinner from the reverse side to the surface side of the nickel coat film 37. Moreover, when the precision of the particle size of the spherical fine particles 36 is higher, the peaks of the individual dents 38, that is, the deepest points may be aligned within one virtual plane common to the plurality of dents 38.

Figure 14:
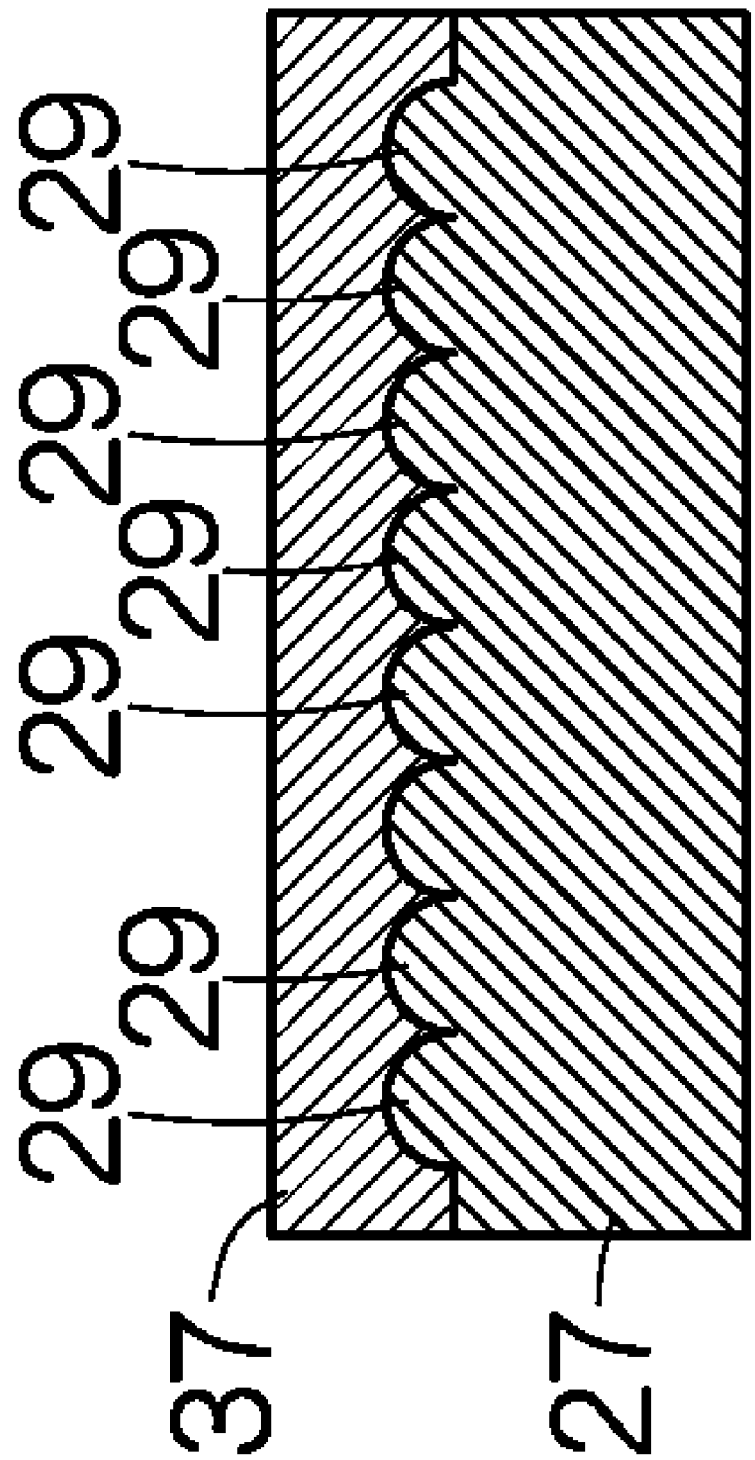
FIG. 14 is a partially magnified sectional view schematically illustrating a molded product, that is, a die formed on the reverse side of a nickel coat film.

Successively, as illustrated in FIG. 14, on the reverse side of the nickel coat film 37, a molded product, that is, a die 27 is formed. The film is formed by plating. Prior to the plating process, an electrode film of nickel is formed on the surface of the nickel coat film 37. The thickness of the electrode film is set, for example, at about 20 nm. The film is formed by, for example, vacuum deposition. Since the dents 38 are tapered from the opening toward the deepest point, the electrode film is formed uniformly on the inner walls of the dents 38. At the same time, the electrode film is formed uniformly on the reverse side of the nickel coat film 37. The electrode films thus formed are processed by electrocasting. The nickel coat film 37 is immersed, for example, in a nickel sulfamate bath. A current of, for example, 50 A flows continuously in the electrode film for 5 hours. As a result, a die 27 of film thickness of 0.5 mm is formed. On the surface of the die 27, dents 29 are formed in an array. The array of the protrusions 29 reflects the array of the dents 38.

Figure 15:
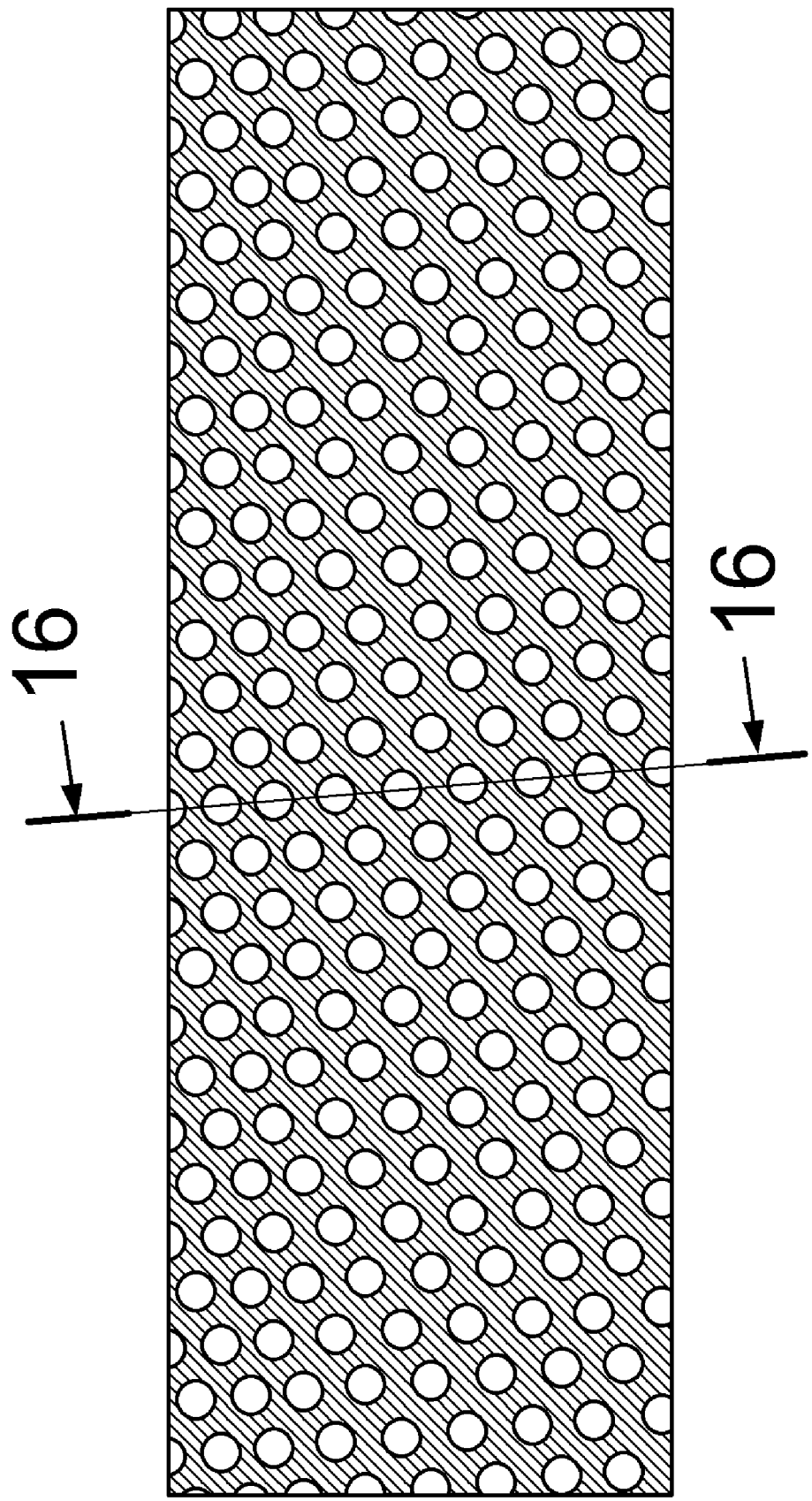
FIG. 15 is an atomic force micrograph corresponding to the plan view of illustrating the surface of a die observed by an atomic force microscope.
Figure 16:
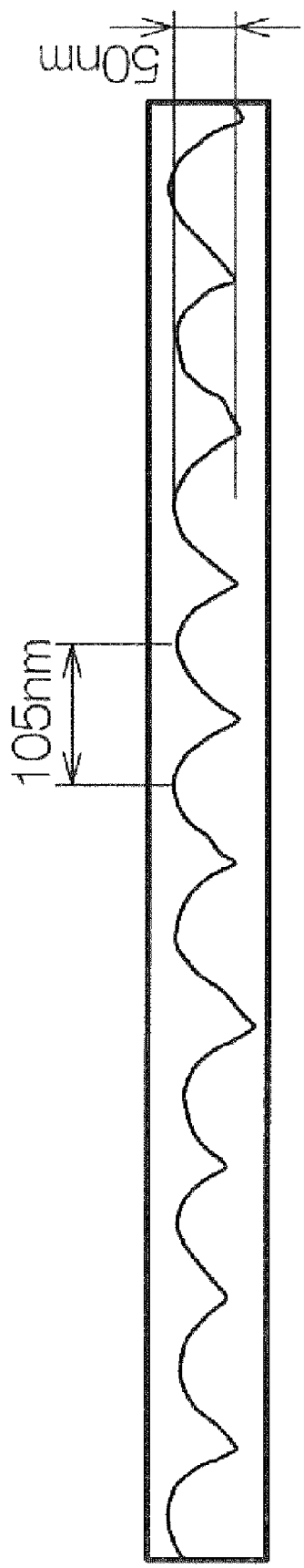
FIG. 16 is a schematic view of a partial section of a die reproduced along line 16-16 in FIG. 15.

According to the manufacturing method above, the present inventor has actually manufactured the die 27. As illustrated in FIG. 15, the inventor observed the microstructure of the die 27 by using an atomic force microscope (AFM). As a result, as clear from FIG. 16, an array of protrusions 29 of about 50 nm in height was observed. In each row, the protrusions 29 were formed in a repeating period of 105 nm.

In a second embodiment of the present technique, the method of manufacturing a die 27 is explained. In this die 27, protrusions 29 are arrayed along a plurality of concentric circles disposed at equal intervals. To realize such arrangement, resist films are formed on the surface of silicon wafer. The resist films divide a plurality of grooves disposed at equal intervals on the surface of the silicon wafer.

More specifically, as mentioned above, a silicon wafer 35 is prepared. On the surface of the silicon wafer 35, an oxide film layer, that is, a silicon oxide layer is formed. The layer is processed by oxygen plasma ashing. The high frequency power is set, for example, at about 50 W. In the chamber, an oxygen gas is released, for example, at a flow rate of about 100 sccm. In succession, on the surface of the silicon wafer 35, a methyl methacrylate resin is applied. It is applied, for example, by spin coating. In the spin coating process, the methyl methacrylate resin is dissolved in ethyl acetate at a concentration of 2.5 wt %. The methyl methacrylate resin is contained by 2.5 wt % in the entire solution. Ethyl acetate is dropped on the surface of the silicon wafer 35. The methyl methacrylate resin thus applied is baked and caked at high temperature of 100 degrees centigrade. Thus, a resin film of methyl methacrylate is formed on the surface of the silicon wafer 35. For example, the thickness of the resin film of methyl methacrylate is set, for example, at about 80 nm.

Figure 17:
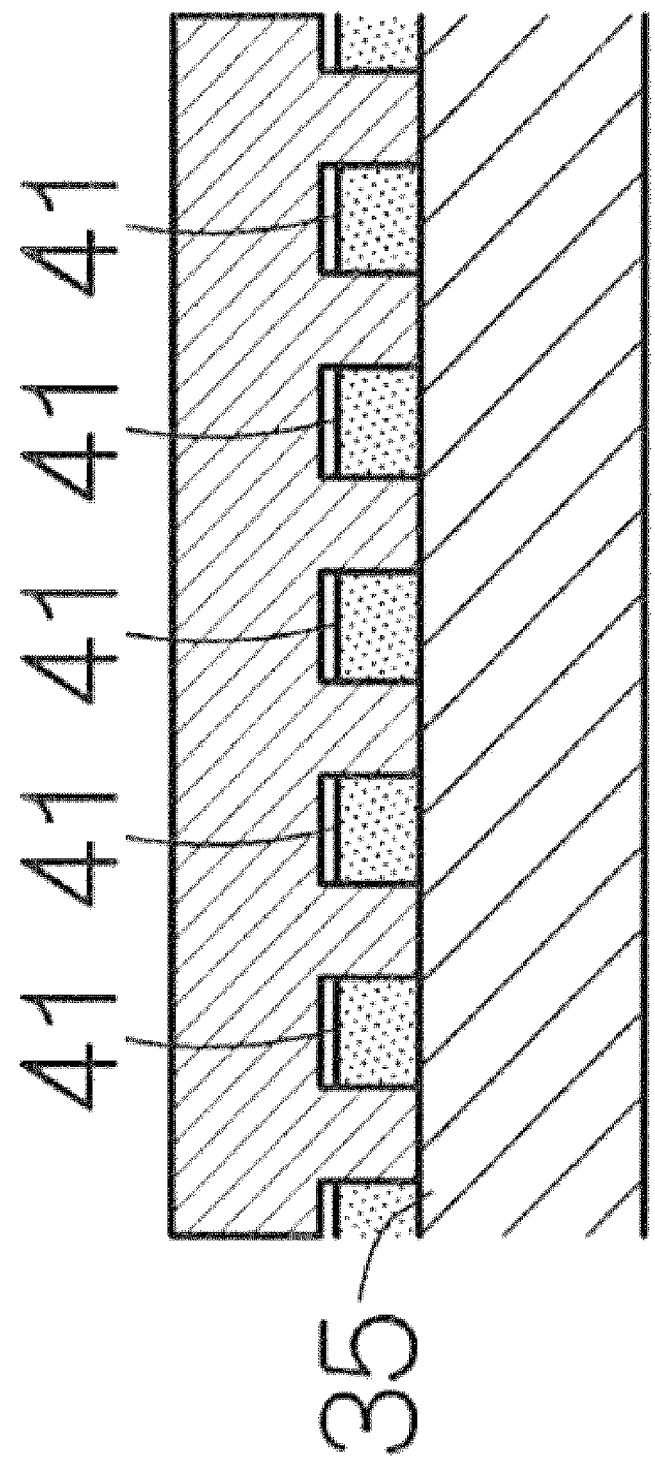
FIG. 17 is a partially magnified sectional view schematically illustrating a resist film formed on the surface of a silicon wafer prior to application of an array of spherical fine particles.

Later, as illustrated in FIG. 17, protrusions 41 are formed on the resin film of methyl methacrylate along a plurality of concentric circles disposed at equal intervals. The protrusions 41 are formed by a nano imprint process. The pitch of the protrusions 41 is set at, for example, 250 nm. The width of the protrusions 41 is set at 70 nm. The mutual interval of the protrusions 41 is set at 180 nm. Thus, when the protrusions 41 are formed concentrically, the resin residue is removed from the surface of the silicon wafer 35. When removing the resin residue, oxygen plasma ashing is applied on the surface of the silicon wafer 35. The high frequency power is set at, for example, about 50 W. In the chamber, an oxygen gas flows at a rate of, for example, 100 sccm. When the resin residue is removed, the surface of the silicon oxide layer is exposed among the protrusions 41. Thus, the resist film is formed.

When the concentric protrusions 41 are established on the surface of the silicon wafer 35, as mentioned above, spherical fine particles 36 of silicon oxide are applied on the surface of the silicon wafer 35. In the process of application, the silicon wafer 35 is immersed in a suspension of spherical fine particles 36. The average particle size of the spherical fine particles 36 is set at 100 nm. The concentration of the spherical fine particles 36 is set, for example, at 1 wt %. For example, when the silicon wafer 35 is lifted from the suspension at a speed of 1 μm/sec, as illustrated in FIG. 9, a single layer of spherical fine particles 36 is formed on the surface of the silicon wafer 35. On the surface of the silicon wafer 35, spherical fine particles 36 are arrayed according to a specified rule based on the self-assembled property. The array of spherical fine particles 36 is established along the concentric circles. As mentioned above, on the surface of the silicon wafer 35, a nickel coat film 37 is formed.

After the nickel coat film 37 is separated from the silicon wafer 35, ion milling is applied to the nickel coat film 37 the same as mentioned above. Herein, prior to ion milling, the methyl methacrylate resin is removed from the surface of the nickel coat film 37. When removing, the nickel coat film 37 is immersed in xylene for 30 minutes. Afterwards, oxygen plasma ashing process is applied to the nickel coat film.

By using such die 27, the magnetic disk 11 is manufactured. As a result, the columnar magnetic bodies 23 are arrayed along a plurality of concentric circles disposed at equal intervals. Hence, the size of magnetic domains is uniform in each bit. The magnetic domains may be arranged along the contour of the recording tracks, and the width is further narrowed in the individual recording tracks.

In a third embodiment of the present technique, the method of manufacturing a die 27 is explained. In this manufacturing method, instead of the spherical fine particles 36 of silicon oxide, spherical fine particles 36 of polystyrene are used. The average particle size of the spherical fine particles 36 of polystyrene is set at, for example 105 nm. When applying such spherical fine particles 36, a suspension is prepared the same as above. In this suspension, the concentration of the spherical fine particles 36 is set at, for example, 0.5 wt %.

When the silicon wafer 35 is lifted from the suspension at a speed of 1 μm/sec, as illustrated in FIG. 9, a single layer of the spherical fine particles 36 is formed on the surface of the silicon wafer 35. On the surface of the silicon wafer 35, spherical fine particles 36 are arrayed according to a specified rule based on the self-assembled property. The same as mentioned above, a nickel coat film 37 is formed on the surface of the silicon wafer 35. As mentioned above, on the surface of the silicon wafer 35, a plurality of grooves may be formed at equal intervals based on the resist film.

After the nickel coat film 37 is separated from the silicon wafer 35, the reverse side of the nickel coat film 37 is processed by etching. Herein, wet etching is applied. The nickel coat film 37 is immersed in an aqueous solution of nitric acid. The concentration of the aqueous solution of nitric acid is set at, for example, 1 wt %. The reverse side of the nickel coat film 37 is dissolved gradually. When the dents 38 carved by the spherical fine particles 36 are reduced from the hemispheres, the nickel coat film 37 is lifted from the aqueous solution of nitric acid. At this time, the reverse side of the nickel coat film 37 is selectively eroded. That is, the spherical fine particles are maintained in the aqueous solution of nitric acid. The inner walls of the dents 38 are continuously covered with the spherical fine particles 36. Therefore, the dents 38 are protected from the aqueous solution of nitric acid. The dents 38 maintain the shape carved by the spherical fine particles 36.

Successively, the spherical fine particles 36 are removed from the nickel coat film 37. The nickel coat film 37 is immersed in xylene. Later, an oxygen plasma ashing process is applied on the nickel coat film 37. The high frequency power is set, for example, at about 100 W. In the chamber, an oxygen gas flows, for example, at a flow rate of about 100 sccm. Thus, an array of dents 38 is formed on the reverse side of the nickel coat film 37. The individual dents 38 are carved by the spherical fine particles 36. The individual dents 38 are divided into partial spheres reduced from the hemispheres, that is, partial spheres becoming thinner from the reverse side to the surface side of the nickel coat film 37. Moreover, when the precision of the particle size of the spherical fine particles 36 is higher, the peaks of the individual dents 38, that is, the deepest points are aligned within one virtual plane common to the plurality of dents 38. Later, on the reverse side of the nickel coat film 37, the same as mentioned above, a molded product, that is, the die 27 is formed.

The average particle size of spherical fine particles 36 of silicon oxide or the average particle size of spherical fine particles 36 of polystyrene is set properly depending on the size of the protrusions 29 formed on the die 27.

As explained herein, the method of manufacturing a molded product includes a step of arraying spherical fine particles on the surface of a board, a step of forming a coat film for covering and concealing the spherical fine particles with the surface of the board while filling the gaps among the spherical fine particles, a step of separating the coat film for holding the spherical fine particles on the reverse side from the board, a step of etching the coat film and spherical fine particles from the reverse side of the separated coat film, a step of removing the spherical fine particles from the coat film, and forming an array of dents carved by the spherical fine particles on the reverse side of the coat film, and a step of forming a film on the reverse side of the coat film, and forming a molded product having an array of protrusions on the surface.

In such manufacturing method, the reverse side of the coat film is gradually shaved according to the etching process. At this time, dents are formed on the reverse side of the coat film by the function of the spherical fine particles. The dents are carved by the outer shape of the spherical fine particles. When such dents are formed partial spheres reduced from the hemispheres, the etching process is terminated. Until the end of etching process, the spherical fine particles are left over in the dents. The inner walls of the dents are covered continuously with the spherical fine particles. Therefore, the inner walls of the dents are protected from erosion. The dents maintain the shape carved by the spherical fine particles. Since the dents are divided by the partial spheres reduced from the hemispheres, the material of the molded product may be securely inserted into the dents when forming the molded product. The surface of the molded product securely reflects the shape of the reverse side of the coat film. Moreover, when the molded product is peeled off from the reverse side of the coat film, the protrusions of the molded product are securely pulled out from the dents of the coat film. The array of protrusions may be formed as desired.

In the method of manufacturing the molded product, the spherical fine particles are composed of silicon oxide or metal oxide, and the coat film is composed of a metal. At this time, the spherical fine particles are composed of silicon oxide, and the coat film is composed of nickel. In such case, ion milling is applied in the etching process. In the forming process of the coat film or the molded product, a plating method may be applied. Besides, the spherical fine particles may be composed of a resin, and the coat film may be composed of a metal.

The molded product manufactured in such method of manufacturing molded product may be used in a method of manufacturing a storage medium. In this case, the method of manufacturing storage medium includes a step of forming a resin layer on the surface of a board used for the storage medium, a step of pressing an array of protrusions of the molded product to the resin layer, and forming a surface shape reflecting the array of protrusions on the resin layer, and a step of forming a shape conforming to a specified pattern on the surface of a board for storage medium based on the surface shape. In this molded product, peaks of protrusions may be arrayed in one virtual plane at high precision. In the pressing process, the peaks of the protrusions may securely contact the surface of the board. The array of protrusions may reflect the surface shape of the resin layer. As a result, on the surface of the board, the shape may be formed with patterns as desired. In this case, in the method of manufacturing the molded product, the spherical fine particles are preferably arrayed along the arc.

As described herein, the present technique provides a method of manufacturing molded product capable of forming an array of protrusions as desired.

All examples and conditional language recited herein are intended for pedagogical purposes to aid the reader in understanding the invention and the concepts contributed by the inventor to furthering the art, and are to be constructed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A method of manufacturing a molded product, comprising:
    arraying spherical fine particles on the surface of a board;
    forming a coat film for covering and concealing the spherical fine particles with the surface of the board while filling the gaps among the spherical fine particles;
    separating the coat film for holding the spherical fine particles on the reverse side from the board;
    etching the coat film and spherical fine particles from the reverse side of the separated coat film;
    removing the spherical fine particles from the coat film, and forming an array of dents carved by the spherical fine particles on the reverse side of the coat film; and
    forming a film on the reverse side of the coat film, and forming a molded product from the film having an array of protrusions on the surface.

2. The method of manufacturing a molded product according to claim 1, wherein the dents are divided by partial spheres becoming thinner from the reverse side to the surface side of the coat film.

3. The method of manufacturing a molded product according to claim 1, wherein the spherical fine particles are composed of silicon oxide or metal oxide, and the coat film is composed of a metal.

4. The method of manufacturing a molded product according to claim 3, wherein the spherical fine particles are composed of silicon oxide, and the coat film is composed of nickel.

5. The method of manufacturing a molded product according to claim 3, wherein ion milling is applied in the etching process.

6. The method of manufacturing a molded product according to claim 3, wherein a plating method is applied in the forming process of the coat film.

7. The method of manufacturing a molded product according to claim 3, wherein a plating method is applied in the forming process of the molded product.

8. The method of manufacturing a molded product according to claim 1, wherein the spherical fine particles are composed of a resin, and the coat film is composed of a metal.

9. The method of manufacturing a molded product according to claim 1, wherein the spherical fine particles are arrayed along an arc.

10. A method of manufacturing a storage medium, comprising:
    forming a resin layer on the surface layer of a board;
    pressing an array of protrusions of a molded product to the resin layer, and forming a surface shape reflecting the array of protrusions on the resin layer; and
    forming a shape conforming to a specified pattern on the surface of the board based on the surface shape, and
    wherein the molded product is manufactured in a manufacturing method which comprises:
    arraying spherical fine particles on the surface of the board;
    forming a coat film for covering and concealing the spherical fine particles with the surface of the board while filling the gaps among the spherical fine particles;
    separating the coat film for holding the spherical fine particles on the reverse side from the board;
    etching the coat film and spherical fine particles from the reverse side of the separated coat film;
    removing the spherical fine particles from the coat film, and forming an array of dents carved by the spherical fine particles on the reverse side of the coat film; and
    forming a film on the reverse side of the coat film, and forming the molded product from the film having an array of protrusions on the surface.

* * * * *